May 11, 1965 R. J. BOYLAN 3,183,285
METHOD OF MAKING A UNIT FILTER ASSEMBLY
Filed July 31, 1961 2 Sheets-Sheet 1
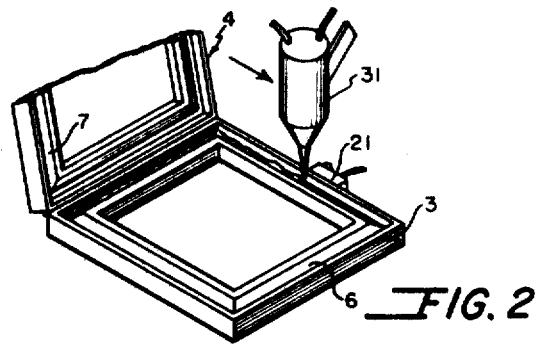
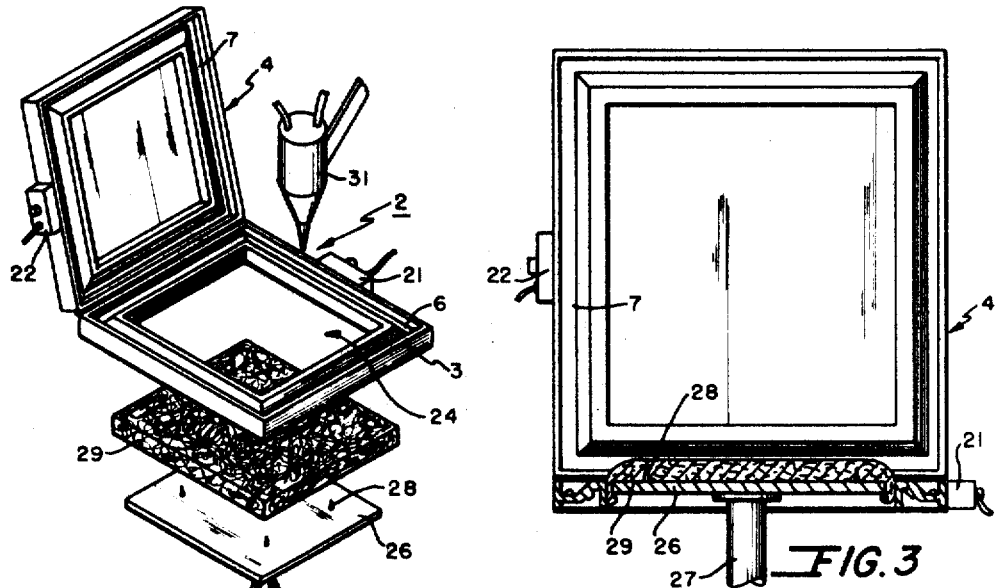
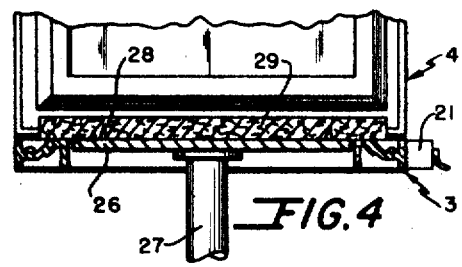
INVENTOR.
ROBERT J. BOYLAN
BY
ATTORNEY

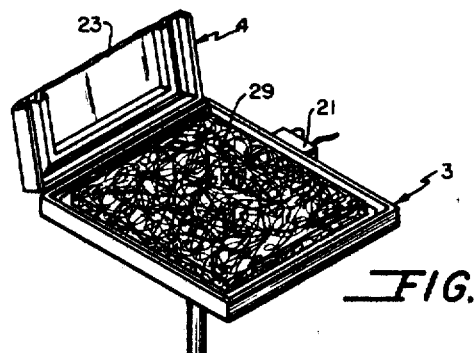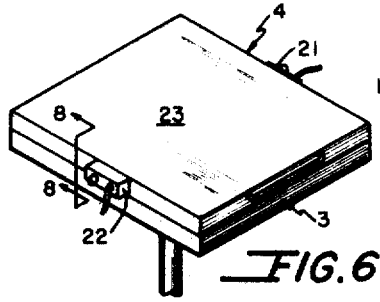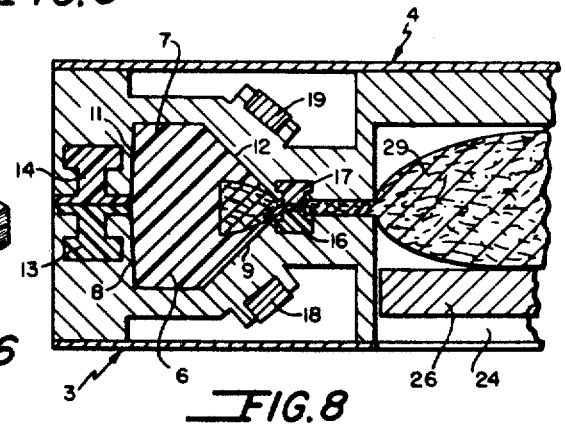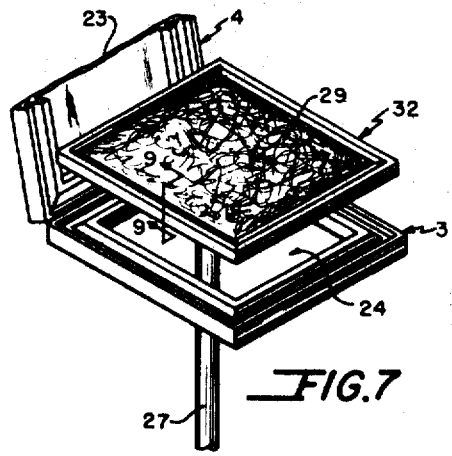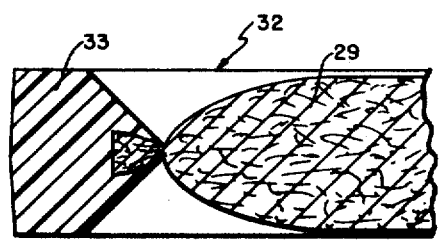
INVENTOR.
ROBERT J. BOYLAN
ATTORNEY

United States Patent Office 3,183,285
Patented May 11, 1965

---

3,183,285
METHOD OF MAKING A UNIT FILTER ASSEMBLY
Robert J. Boylan, Jeffersonville, Ind., assignor to American Air Filter Company, Inc., Louisville, Ky., a corporation of Delaware
Filed July 31, 1961, Ser. No. 128,039
4 Claims. (Cl. 264—45)

The present invention relates to filters and more particularly to an improved method of making unit filter assemblies. This invention comprises a further improvement over that invention set forth in assignee's co-pending application of John D. Harms, Serial No. 128,047, filed on July 31, 1961, wherein a novel filter assembly and method of making the same is disclosed—the filter assembly of the co-pending application including an open-end border frame member of gas expanded plastic compound and a sheet of filter medium disposed therein with edge portions of the medium being embedded in the plastic compound to be supported thereby.

In accordance with the features of the present invention a novel unit filter forming method is provided, including the steps of utilizing a partially confined border frame zone to receive expansible plastic compound and to support filter medium. In addition, the present invention provides novel steps for insuring that filter medium is properly centered with respect to the border frame zone, for insuring that the border frame zone is properly heated during assembly operations, and for controlling the set time of expansible plastic compound introduced into the border frame zone.

Various other features of the present invention will become obvious to one skilled in the art upon reading the disclosure set forth hereinafter.

More particularly, the present invention provides a method of forming a filter assembly of a type including an open end border frame member having a sheet of filter medium disposed therein and supported thereby comprising the steps of supplying a controlled quantity of expansible plastic compound in reduced bulk form along a partially confined border frame zone, positioning an appropriately sized sheet of filter medium adjacent the partially confined zone with edge portions of the medium extending over the expansible plastic compound introduced along the partially confined zone, confining the remaining portion of the border frame zone with edge portions of the filter medium extending therein, expanding the plastic compound in bulk form to the limits of confinement with edge portions of the filter medium embedding in the plastic compound, and allowing the plastic compound to set before releasing the filter assembly. To carry out the aforedescribed inventive method, the present invention further provides a mold member sized to support the filter medium, the mold member including a peripheral channel disposed therein to receive expansible plastic compound which sets to form the border member of the filter assembly and a loading and ejecting passage surrounded by the peripheral channel for loading the filter medium and ejecting the completed filter assembly.

It is to be understood that various changes can be made by one skilled in the art and in the several steps of the method without departing from the scope or spirit of the present invention.

Referring to the drawings:

FIGURE 1 is an isometric exploded view of the several parts of a mold apparatus used to carry out the inventive method;

FIGURE 2 is an isometric view of the mold of FIGURE 1 as it is charged with plastic compound;

FIGURE 3 is an enlarged end view of the mold of FIGURES 1 and 2 as it is loaded with a sheet of filter medium;

FIGURE 4 is an enlarged end view of a portion of the mold of FIGURE 3, disclosing a sheet of filter medium in loaded position;

FIGURE 5 is an isometric view of a portion of the mold of FIGURE 4, in loaded position prior to closing;

FIGURE 6 is an isometric view of the mold in closed position;

FIGURE 7 is an isometric view of a portion of the mold, disclosing the unit filter assembly as it is released from such mold;

FIGURE 8 is an enlarged cross sectional view taken in a plane passing through line 8—8 of FIGURE 6, disclosing details of a portion of the mold and the unit filter assembly disposed therein, and FIGURE 9 is an enlarged cross-sectional view taken in a plane passing through line 9—9 of the unit filter assembly of FIGURE 7, after the unit filter assembly has been removed from the mold.

In carrying out the method of the present invention, a filter medium support zone in the form of a rectangularly shaped mold assembly 2 is provided (FIGURE 1). It is to be understood that the present invention is not limited to the particular mold assembly described herein but that other types of molds can be used to support the filter medium, the type of mold depending upon the desired shape of the final filter assembly to be manufactured.

As can be seen in FIGURE 1 of the drawings, mold assembly 2 includes lower mold member 3 and upper mold member 4 hinged thereto at one end by some suitable form of hinge (not shown in detail). Mold 2, which is sized and shaped in accordance with the desired size and shape of the unit filter assembly to be made, can be constructed from some suitable heat conducting metal. Advantageously, aluminum which is light in weight, which is readily fabricated to form, and which has excellent heat conducting properties can be used. As can be seen in FIGURE 1 of the drawings, lower mold member 3, which is designed to support a sheet of filter medium, includes a rectangularly shaped peripheral channel 6. This channel 6 defines a portion of a partially confined zone into which a suitable expansible plastic compound is introduced (as described hereinafter). In like manner, upper mold member 4 includes a rectangularly shaped peripheral channel 7 that corresponds to and is adapted to cooperate with channel 6 when mold members 3 and 4 are brought into facing contact. With such an arrangement, channels 6 and 7 serve to define a confined border frame mold in which expansible plastic compound introduced in unexpanded or reduced bulk form in channel 6 can expand to the limits of confinement (as described hereinafter). It is to be noted (FIGURE 8) that the planes determining the side walls of lower peripheral channel 6 slope as at 8 and 9 at an angle to the plane determining the face of the lower mold member and, equally the planes determining the side walls of upper peripheral channel 7 also slope as at 11 and 12 at an angle to the plane determining the face of the upper mold member 7. With such a sloping arrangement of the side walls, separation of the mold members and removal of a final filter assembly is greatly facilitated. As also can be seen in FIGURE 8 of the drawings, the walls defining peripheral channels 6 and 7 are provided at their mating faces with mating outer seals or gaskets 13, 14 and mating inner seals or gaskets 16, 17. Advantageously, these seals or gaskets can be made of hard rubber or neoprene, the seals serving to insure that the border frame mold is appropriately confined when the upper and lower mold members are brought into assembled facing relationship during filter assembly forming operations.

To heat lower mold member 3, a peripheral heating coil 18 is provided in recess in the mold member so as to surround the peripheral channel 6. In like manner, to heat upper mold member 4 a peripheral heating coil 19 is provided in a recess of this mold member so as to surround peripheral channel 7. Heating coils 18, 19 are connected to receptacles 21, 22, respectively, which are mounted on the outside of their respective lower and upper mold members to a suitable source of electric power (not shown). It is to be noted that upper mold member 4 is provided with a suitable cover 23 interposed in the area defined by peripheral channel 7. On the other hand, peripheral channel 6 of lower mold member 3 does not have such a cover. Rather, peripheral channel 6 serves to define filter medium passage 24 through which a sheet of filter medium can be centered, passed and loaded in a manner described hereinafter. To load a filter medium sheet, a suitable support jig or platform 26 movably mounted on hydraulically operated arm 27 is positioned below filter medium passage 24 in alignment therewith. Platform or jig 26, which is sized and aligned to clear filter medium passage 24 includes a set of prongs 28 which are adapted to hold a sheet of filter medium in appropirate position for loading.

In carrying out the inventive method with the apparatus aforedescribed, a suitable and appropriately sized sheet of filter medium 29, which advantageously can be expansible-compressible porous fiber glass, is placed on support 26 with prongs 28 embedded in the medium to hold it in position below passage 24 of mold 3. In this connection, it is to be noted that sheet of medium 29 is of a size and shape such that although it conforms in shape with filter passage 24 it is somewhat larger in width and length than this passage so that the edges thereof extend beyond the passage. Lower and upper mold members 3 and 4 of mold assembly 2 are then preheated through coils 18 and 19, respectively, to desired temperatures, which advantageously can be in the range of approximately 140° F. to approximately 160° F. With upper mold member 4 pivoted away from lower mold member 3, a thin coating of a suitable release agent, advantageously wax, is applied to the faces of peripheral channels 6 and 7. Once the release agent coating is applied, mixing head 31 (FIGURE 2) is moved along peripheral channel 6 to deliver an expansible plastic compound in unexpanded or reduced bulk form. The plastic compound, as in co-pending Harms application Serial No. 128,047, advantageously can be a chain extending cross-linking, gas forming polymerizable plastic compound, which at ambient temperatures has a viscous liquid or paste form. And, as in the aforementioned Harms application, a foam polyurethane produced from toluene di-isocyanate (or any other di-isocyanate) and a polyether resin mixed with a catalyst, silicone and propellent can be used. Although a polyether resin is considered to be most advantageous, it is to be understood that a polyether or a polyol resin can be used instead. As a propellant, a trichlorofluoro methane has been found to be most advantageous and as a catalyst, a tertiary amine, such as di-methyl ethanolamine, with a minor portion of a tin compound such as dibutyl tin dilaurate (less than 1% by weight of the catalyst) added can be used. The tin catalyst serves to enhance control of the "cream time," that is the time between passing of the plastic compound from mixing head 31 in paste form to peripheral channel 6 and the setting of the compound in expanded form in the confined border frame zone defined by mating channels 6 and 7. Once the plastic compound has been appropriately inserted in lower peripheral channel 6, arm 27 is actuated to move support 26 upwardly with the filter medium sheet 29 mounted on prongs 27. As can be seen in FIGURE 3 of the drawings, since filter medium sheet 29 is greater in length and width than filter medium passage 24 of mold member 3, the edges of the sheet are deflected and bend as the sheet passes through passage 24. Finally, when support 26 is of a higher elevation than the top face of lower mold member 3, the filter medium edges spring out equally along all sides over the expansible plastic compound which has been previously introduced into the peripheral channel 6. Support 26 is then lowered and upper mold member 4 is closed and clamped by some suitable clamping means (not shown). After a suitable period of time (1½ to 6 minutes), the plastic compound in peripheral channel 6 expands to the limits of the confined border mold defined by peripheral channels 6 and 7 which are sealed by facing gaskets 13, 14 and 16, 17 and the plastic compound sets with the edges of filter medium sheet 29 embedded therein in sealed relationship therewith. Upper mold member 4 is then moved away from lower mold member 3. Arm 27 is moved upwardly once again so that support 26 engages against the completed filter assembly 32 with substantially rigid polyurethane border frame 33 to remove it from mold 3. The process can then be repeated to form additional unit filter assemblies. In this connection, it is to be noted that when the process is repeated it is not necessary to add additional release agent for each filter assembly to be formed but that one release agent coating serves adequately for the production of two or possibly three filter assemblies.

The invention claimed is:

1. A method of forming a filter assembly of a type including an open-end border frame member having a sheet of filter medium disposed therein and supported thereby comprising the steps of supplying a controlled quantity of expansible polymeric plastic compound in unexpanded form along a partially confined border frame mold surrounding a filter medium support zone, positioning and supporting an appropriately sized sheet of porous filter medium adjacent said partially confined mold with peripheral edge portions of said medium extending over said expansible plastic compound introduced along said partially confined mold, confining the remaining portion of said border frame mold with said edge portions of said filter medium extending therein, heating said plastic compound to expand said compound to the limits of confinement of said mold with said edge portions of said porous filter medium embedding in said plastic compound, and releasing the finished filter assembly from confinement after said heated and expanded plastic compound has set.

2. A method of forming a filter assembly of a type including an open-end border frame member having a sheet of filter medium disposed therein and supported thereby comprising the steps of supplying a controlled quantity of expansible polymeric plastic compound in unexpanded form along a partially confined border frame mold surround a filter medium passage, passing an appropriately sized sheet of porous filter medium through said passage to position said medium adjacent said partially confined mold with peripheral edge portions thereof extending over said expansible plastic compound introduced along said partially confined mold, confining the remaining portion of said border frame mold with edge portions of said filter medium extending therein, heating said plastic compound to expand said compound to the limits of confinement of said mold with the edge portions of said porous filter medium embedding in said plastic compound and releasing the finished filter assembly from confinement after said heated and expanded plastic compound has set.

3. A method of forming a filter assembly of a type including an open-end border frame member having a sheet of filter medium disposed therein and supported thereby comprising the steps of supplying a controlled quantity of expansible foam polyurethane plastic compound in unexpanded form along a partially confined border frame mold, positioning an appropriately sized sheet of porous filter medium adjacent said partially confined mold with the peripheral edge portion of said medium extending over said expansible polyurethane plastic compound introduced along said partially confined mold, confining the remaining portion of said border frame mold with the edge portions of said porous filter medium extending therein, heating said polyurethane plastic compound to expand said compound to the limits of confinement of said mold with the edge portions of said porous filter medium embedding in said plastic compound, and releasing the finished filter assembly from confinement after said heated and expanded plastic compound has set.

4. A method of forming a filter assembly of a type including an open-end border frame member having a sheet of filter medium disposed therein and supported thereby comprising the steps of supplying a controlled quantity of expansible foam polymeric plastic compound in unexpanded form along a partially confined border frame mold surrounding and adjacent to a filter medium passage, passing an appropriate sized sheet of porous filter medium upwardly through said passage to center and position the medium adjacent said partially confined mold with the peripheral edge portions of said medium extending over the expansible plastic compound introduced along said partially confined mold, confining the remaining portion of said border frame mold with said edge portions of said filter medium extending therein, heating said plastic compound to expand said compound to the limits of confinement of said mold with the edge portions of said filter medium embedding in said plastic compound and releasing the finished filter assembly from confinement after said heated and expanded plastic compound has set.

References Cited by the Examiner

UNITED STATES PATENTS

| | | | |
|---|---|---|---|
| 2,193,935 | 3/40 | Mulcahy | 18—59 XR |
| 2,220,127 | 11/40 | Slayter | 55—502 |
| 2,782,887 | 2/57 | Zimmermann. | |
| 3,036,342 | 5/62 | Fino | 18—59 |
| 3,067,149 | 12/62 | Dombrow et al. | 260—2.5 |

FOREIGN PATENTS

| | | |
|---|---|---|
| 167,457 | 8/22 | Great Britain. |
| 1,104,477 | 6/55 | France. |

OTHER REFERENCES

Plastics Engineering Handbook, 3rd Edition, Reinhold Publishing Corp., Copyright 1960, pp. 171–176 and p. 179, pp. 180–188.

ROBERT F. WHITE, *Primary Examiner.*

WILLIAM J. STEPHENSON, MORRIS LIEBMAN,
*Examiners.*

UNITED STATES PATENT OFFICE
CERTIFICATE OF CORRECTION

Patent No. 3,183,285　　　　　　　　　　　　　　May 11, 1965

Robert J. Boylan

It is hereby certified that error appears in the above numbered patent requiring correction and that the said Letters Patent should read as corrected below.

Column 4, line 56, for "surround" read -- surrounding --.

Signed and sealed this 5th day of October 1965.

(SEAL)
Attest:

ERNEST W. SWIDER
Attesting Officer

EDWARD J. BRENNER
Commissioner of Patents